Feb. 21, 1967 D. E. SUNSTEIN 3,305,788
SIGNAL PHASING NETWORK
Original Filed Nov. 3, 1958 2 Sheets-Sheet 1

INVENTOR.
DAVID E. SUNSTEIN
BY Jacob Trachtman
ATTORNEY

INVENTOR.
DAVID E. SUNSTEIN
BY Jacob Trachtman
ATTORNEY.

United States Patent Office 3,305,788

Patented Feb. 21, 1967

3,305,788

SIGNAL PHASING NETWORK

David E. Sunstein, 464 Conshohocken State Road, Bala-Cynwyd, Pa. 19004

Continuation of application Ser. No. 771,614, Nov. 3, 1958. This application Nov. 25, 1964, Ser. No. 415,855
25 Claims. (Cl. 328—155)

Figure 1:
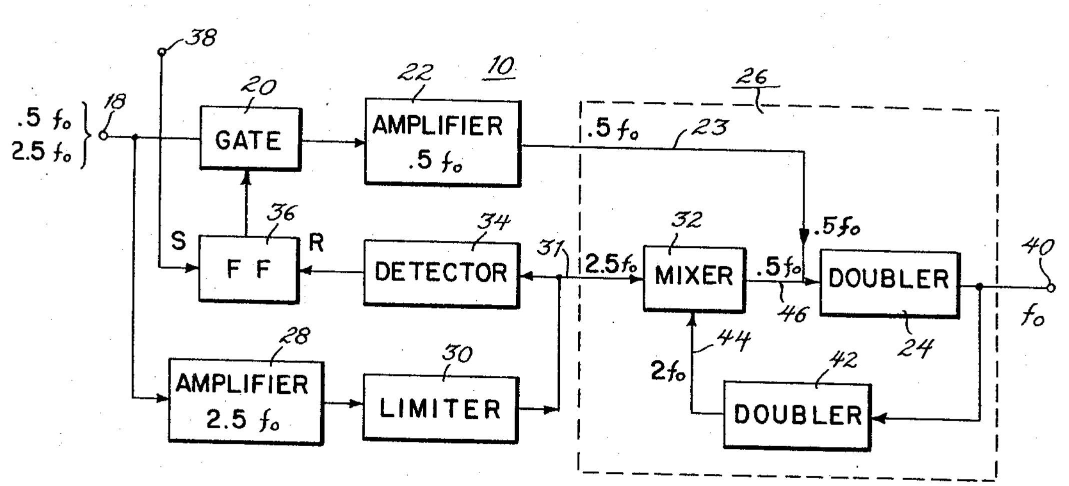

This is a continuation application of my United States application Serial No. 771,614, filed November 3, 1958, entitled, Signal Phasing Network.

The invention relates to a signal phasing network and more particularly to a network energized by a drive signal to produce an output signal which has its phase initially determined by a phasing signal preceding the drive signal.

Heretofore, drive signals have been supplied to networks to produce output signals which have been ambiguous with respect to phase. For example, when a signal has its frequency reduced, the phase of the resulting signal is not unambiguously determined. Thus, if the phase of the reduced signal is to be of particular significance, it must be unambiguously determined. Of course, such a determination requires additional information which must be supplied to the network.

The invention provides a network in which it is not essential that this phase information be continuously supplied. The network after initially receiving such a phasing signal, continues to produce an output signal of the desired phase upon continued excitation by the ambiguous signal.

It is therefore the primary object of this invention to provide a new and improved signal phasing network delivering an output signal determined by a phasing signal and continuously produced by a drive signal.

Another object of the invention is to provide a new and improved signal phasing network particularly adapted for color television systems.

Another object of the invention is to provide a new and improved signal phasing network utilizing in succession an unambiguous signal and an ambiguous signal for producing an unambiguous signal.

Another object of the invention is to provide a new and improved signal phasing network which is reliable, effective, and efficient in operation.

Another object of the invention is to provide a new and improved signal phasing network adapted for use in color television systems for producing an unambiguous index signal.

Another object of the invention is to provide a new and improved signal phasing network adapted for use in a color television system excited by an initially unambiguous index signal followed by an ambiguous index signal for producing an unambiguous index signal of low contamination during the process of color rendition.

Another object of the invention is to provide a new and improved signal phasing network adapted for use in a color television system combining color information signals with the index signals to modify the intensity of the cathode ray beam for high fidelity color reproduction.

The above objects of the invention as well as many other objects are achieved by providing a signal phasing network which comprises a frequency multiplier circuit and a frequency mixing circuit energized by a drive signal and a phasing signal. The phasing signal has a frequency less than that of the drive signal. The phasing network initially receives the phasing signal for unambiguously determining the phase of its output signals, and thereafter is energized by the drive signals. The output signals from the phasing network has a frequency which is less than the frequency of the drive signal and with a phase which is determined by the phasing signal.

Reference is made to the applicant's copending application Serial No. 588,878, entitled, Index Signal Generating Means, issued on June 23, 1959, as Patent No. 2,892,123, and copending application Serial No. 588,877, entitled, Index Signal System for Cathode Ray Tube and Method, issued on December 12, 1961, as Patent No. 3,013,113, which describe and claim the signal phasing network of the invention in connection with other apparatus and particularly in connection with a color television system.

Figure 2:
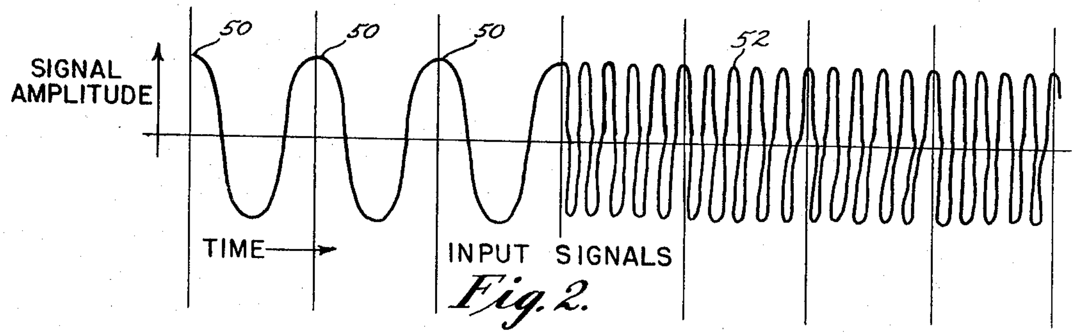

With the foregoing discussion in mind, this invention will be most readily understood from the following detailed description of a representative embodiment thereof, reference for this purpose being had to the accompanied drawings, in which:

FIGURE 1 diagrammatically illustrates in block form a signal phasing network embodying the invention, FIGURE 2 illustrates in graphic form the phasing drive signals delivered to the input terminal of the network of FIGURE 1.

Figure 3:
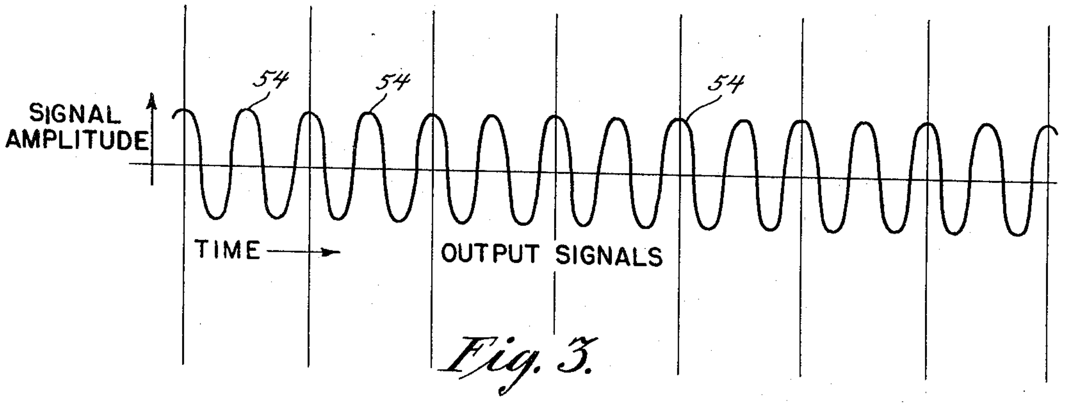
Figure 4:
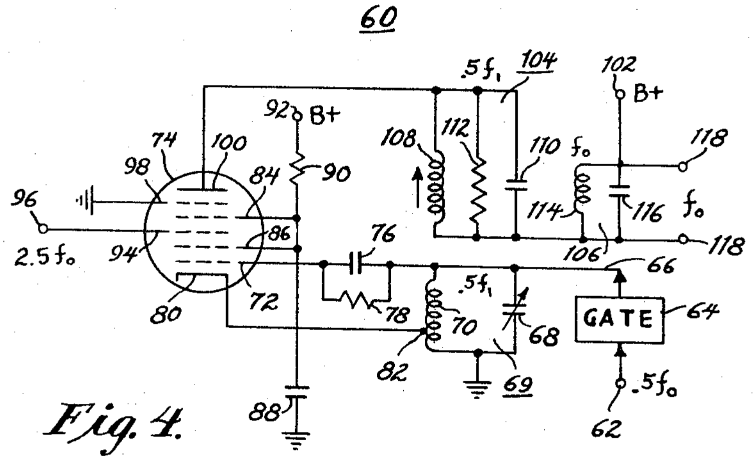

FIGURE 3 illustrates in graphic form the output signal delivered by the phasing network responsive to the input signals shown in the FIGURE 2, and FIGURE 4 schematically illustrates another form of the invention.

Like reference numerals designate like parts throughout the several views.

Refer to the figures for a description in detail of the signal phasing network 10 which has a signal input terminal 18. The signals received by the input terminal 18 are graphically illustrated in the FIGURE 2. The initial signal received is a phasing signal 50, followed by a drive signal 52 having a frequency five times that of the phasing signal 50. The FIGURE 3 graphically illustrates the output signal 54 of the network 10.

The output signal 54 has a frequency double that of the phasing signal 50, while its frequency is reduced by a factor of 2.5 from the drive signal 52.

The signal from the input terminal 18 is delivered through a gate circuit 20 to an amplifier 22. The amplifier 22 is tuned to a frequency which is one-half of the frequency of the output signal 54 of the network 10. The signal from the amplifier 22 is delivered over the line 23 to a frequency doubler circuit 24 of the phasing circuit 26 shown within the dashed lines. The frequency doubler circuit 24 delivers its output signal to an output terminal 40 which delivers the signals 54 shown in the FIGURE 3.

The signals on the input terminal 18 are also delivered to an amplifier 28 which is tuned to a frequency of 2.5 times the frequency of the output signal 54 of the network 10. The output from the amplifier 28 is delivered to a limiter circuit 30 or an automatic volume control. The output from the limiter 30 is delivered over a line 31 to a frequency mixing circuit 32 of the phasing circuit 26. The output signal from the limiter 30 is also received by a detector 34 which delivers a reset signal to a multistable or flip-flop circuit 36. The limiter 30 maintains its output signal relatively independent of variations in the amplitude of its input signal, if the latter is not substantially zero.

The multistable circuit 36, in its reset state, delivers a signal to the gate circuit 20 inhibiting the passage of signals to the amplifier 22, while when placed in its set state by a signal from the input terminal 38, it conditions the gate circuit 20 for passage of input signals.

A second frequency doubling circuit 42 of the phasing circuit 26 is excited by the output signals of the frequency doubling circuit 24, and delivers its output signal over line 44 to the frequency mixing circuit 32. The frequency mixing circuit 32 upon receiving input signals over the lines 31 and 44 delivers a signal having a frequency of one-half the frequency of the output signal 54 to the frequency doubling circuit 24.

In the operation of the phasing network 10, the set terminal 38 is adapted to receive a pulse setting the network 10 to start operation. The set signal causes the flip-flop 36 to deliver a gating signal to the gate circuit 20.

The FIGURE 2 shows the phasing signal 50 which is first delivered to the input terminal 18 and which is followed by the drive signal 52. The signal 50 has a frequency of one-half of the frequency of the output signals 54 shown in the FIGURE 3, while the drive signal 52 has a frequency 2.5 times that of the output signal 54 of the network 10.

Although the signal 50 is delivered to the input of the amplifier 28, since this amplifier is tuned to a frequency 2.5 times the output frequency, it does not deliver an output signal. This signal 50, however, is also delivered through the gate 20 to the amplifier 22 which is tuned to the frequency of the incoming signal and passes it to the frequency doubling circuit 24 of the phasing circuit 26. This energizes the doubler 24 which produces an output signal 54 at double the frequency of the phasing signal 50. The output signal 54 excites the second frequency doubling circuit 42. The circuit 42 produces a signal having a frequency two times the frequency of the output signal 54 which is delivered to the frequency mixer circuit 32. Since the input line 31 to the mixer 32 is not energized at this time, an output beat signal is not produced by the mixer 32.

Following the phasing signal 50, the input drive signal 52 having a frequency which is 2.5 times the frequency of the output signal 54 is delivered to the input terminal 18 (see FIGURE 2). This signal is received by the amplifier 28 which now delivers an output signal to the limiter 30. The output signal of the limiter 30 is received by the detector circuit 34 which delivers a signal to the flip-flop circuit 36 resetting it. The flip-flop 36 in its reset position prevents the passage of input signals through the gate 20 to the amplifier 22.

The output signal at 2.5 times the frequency of the output signal 54 of the network 10, is also delivered over the line 31 to the frequency mixer 32. The receipt of signals from both of the input lines 31 and 44 allows the mixer circuit to produce an output beat signal with a frequency which is the difference of the frequencies of the input signals. The output beat signal has a frequency which is one-half of the frequency of the output signal 54. This is delivered over the line 46 to the frequency doubling circuit 24. The frequency doubling circuit 24 which was previously energized by unambiguous phasing signals 50 derived from the amplifier 22 is now energized by signals 52 received over the line 46 from the frequency mixing circuit 32. The signals received over line 46 have the same frequency and phase as the signals originally derived from the amplifier 22. Therefore, the output signal from the doubler 24 which is at the frequency of the output signals 54, unambiguously maintains its original phase determined by the original phasing signals 50.

From the above, it is evident that by utilizing the initial phasing signals 50 which unambiguously determine the phase of the output signal 54, the ambiguous drive signals 52 derived thereafter having a frequency 2.5 times the frequency of the output signals 54 may be utilized to continue to produce and deliver to the output terminal 40 the unambiguous signal 54.

It is noted that the phasing circuit 26 is locked into the proper phase relationship at the initiation of its operation. This locked relationship is maintained throughout the remainder of its operation while driven by the ambiguous signals 52 occurring at the frequency of 2.5 times the frequency of the output signal 54.

The pulse delivered to the terminal 38 when operation of the network 10 is initiated sets the flip-flop 36 to allow the gate 20 to pass phasing signals 50 to the amplifier 22. Signals 50 are prevented from reaching the amplifier 22 soon after its initiating operation of locking the phasing circuit 36 has been accomplished. This automatically results soon after drive signals 52 are received at the frequency rate of 2.5 times the frequency of the output signals 54. This assures the delivery of energization to the phasing circuit 26 without interruption from its initial to its final stage of operation. Since signals from the amplifier 22 have no further function, but might interfere with the operation of the phasing circuit 26, this is prevented by the arrangement disclosed. Of course, other means may be employed to respectively deliver phasing and drive signals to the lines 23 and 31 of the phasing circuit 26.

The output signal 54 delivered at the output line 46 of the phasing network 10 is unambiguously related to the drive signal 52 and may be used for many purposes. The applicant's copending applications entitled, Index Signal Generating Means and Index Signal System, particularly describe the use of the network 10 in connection with color television. However, the invention is not limited to such use as will be readily evident to those skilled in the art.

The FIGURE 4 schematically illustrates a signal phasing network 60 which embodies the invention in another form.

The network 60 is a modification of the Bradley frequency modulation detector. The Bradley detector has been described in detail by W. E. Bradley in the publication "Electronics" for October 1946, pp. 88 to 91.

The network 60 is provided with an input terminal 62 for receiving from a low impedance source such as a cathode follower, an unambiguous signal such as the signal 50 shown in FIGURE 2. The signals received by terminal 62 may be passed through a gate 64 conditioning their delivery to a line 66. This gate may be a conventional pair of clamping diodes so arranged so that when conducting they cause the low impedance source connected to terminal 62 to load down the tuned circuit 69 to the point where self oscillations therein cannot be sustained by tube 74 alone, but only by signals applied to terminal 62. The line 66 is returned to ground potential through variable capacitor 68 which is connected in parallel with inductor 70 forming a resonant circuit 69 substantially tuned to the frequency of the incoming signals at terminal 62. The line 66 is also connected to the first control electrode 72 of a heptode valve 74 by a coupling capacitor 76 which is bridged by a grid resistor 78.

The cathode 80 of the valve 74 is joined to a tap 82 on the inductor 70, while the screen electrodes 84 and 86 are returned by the by-pass capacitor 88 to ground potential and by the resistor 90 to the positive potential terminal 92.

The second control electrode 94 of valve 74 is connected to the input terminal 96 which receives drive signals, such as the signals 52 shown in FIGURE 2. The suppressor electrode 98 is returned to ground potential, while the anode 100 is connected to a positive potential terminal 102 through the series connected parallel resonant circuits 104 and 106.

The resonant circuit 104 comprises an inductor 108 connected in parallel with the capacitor 110 and a damping resistor 112. The resonant circuit 104, like the resonant circuit 69, is tuned substantially to the frequency of the incoming signal at the terminal 62. The damping resistor 112 of the resonant circuit 104, however, provides a broadly tuned network. The inductor 108 is inductively coupled with the inductor 70 of the resonant circuit 69, so that changes in the current of the anode 100 has the effect of changing the resonance frequency of the resonant circuit 69. This is because the feedback from the inductor 108 of circuit 104 to the inductor of circuit 69 is reactive.

The resonant circuit 106 comprises an inductor 114 in parallel with a capacitor 116 connected between the resonant circuit 104 and the positive potential terminal 102. The inductor 114 and capacitor 116 have connected across them a pair of output terminals 118. The output terminals 118 deliver an output signal with frequency $f_o$.

In operation, an unambiguous input signal is initially delivered to the input terminal 62, which for example, may be the signal 50 with a frequency ($.5f_o$) of one-half of the output frequency. The resonant circuit 69 which is tuned to this frequency ($.5f_o$) is caused to oscillate by the delivery of the input signal to the terminal 62 since gate 64, as mentioned above, couples the low impedance source feeding terminal 62 tightly into tank circuit 69. Thus, the oscillations of circuit 69, are set up in phase with the phase of the input signal to terminal 62. The input signal at terminal 62 may now be removed by turning off gate 64. Thereafter oscillations will be sustained in tank 69 by the cathode coupled oscillator connections between tank 69 and the cathode, first control grid, and screen grid of tube 74.

The oscillatory signal thus set up in the resonant circuit 69 is thereafter continuously delivered to the control electrode 72 of the valve 74. The control electrode 72 is highly biased to provide class "C" operation. Thus, upon each concurrence of the positive-going signals to the electrodes 72 and 94 of the valve 74 a narrow pulse of anode current is caused to flow through the valve 74. This sets up oscillations in the resonant circuit 104, which delivers feedback signals to the resonant circuit 69 maintaining its oscillations phase synchronized as is evident below.

The amplitude of the anode current is a function of the phase relationship of the signals delivered to the control electrodes 72 and 94 of the valve 74. It is also noted that the reactive feedback from circuit 104 to circuit 69 is proportional to the anode current. Thus, the phase relationship of the driving signal on electrode 94 with respect to that of the signal on the control electrode 72 of valve 74, affects the magnitude of the plate current, and controls the frequency of the resonant circuit 69.

The phase of the signal on the control electrode 94 is at quadrature with that on the control electrode 72. By a quadrature phase relationship between these two signals, one of which is the fifth harmonic of the other, it is here meant that every positive peak of the signal on grid 72 is coincident in time with each fifth corresponding zero crossing (in a downward direction, or upward direction depending upon the sign or polarity of the mutual coupling between coils 108 and 70) of the sinewave on terminal 96. However, should this relationship be disturbed a change in the anode current results in a shift in the frequency of the tuned circuit 69, which tends to re-establish the quadrature relationship whereby the anode current maintains its normal value. Thus the phase of the unambiguous signal of circuit 69 is locked in or controlled by its phase relationship with the ambiguous signal of higher frequency delivered to the input terminal 96.

The resonant circuit 106 is tuned to the output frequency $f_o$ which is two times the frequency of the resonant circuit 104. It is also two times the frequency of the unambiguous signal initially delivered to the input terminal 62, and two-fifths of the frequency of the ambiguous drive signal delivered to the input terminal 96.

Thus by initially delivering an unambiguous signal to the resonant circuit 69, and continuously delivering an ambiguous drive signal to the input terminal 96, an output signal of unambiguous nature having a frequency lower than that of the drive signal may be continuously produced thereafter.

The relative frequencies for the phasing, drive and output signals were specified for the purpose of illustration. Of course, other frequency relations may be used with appropriate modifications of the networks 10 and 60 as will be obvious to those versed in the art.

It will, of course, be understood that the description and drawings, herein contained, are illustrative merely, and that various modifications and changes may be made in the network disclosed without departing from the spirit of the invention.

What is claimed is:

1. A phasing network comprising input means for receiving respective phasing and drive signals, a frequency multiplier circuit adapted to receive from said input means a phasing signal of predetermined frequency for producing an output signal, and a frequency mixing circuit excited by the output signal of said multiplier circuit and adapted to receive from said input means a drive signal having a frequency greater than that of said phasing signal, said mixing circuit delivering its output signal to said multiplier circuit.

2. A phasing network comprising input means for receiving respective phasing and drive signals, a frequency multiplier circuit adapted to receive from said input means a phasing signal of predetermined frequency for producing an output signal, and a frequency mixing circuit receiving the output signal of said multiplier circuit and adapted to receive from said input means a drive signal having a predetermined frequency greater than that of said phasing signal, said mixing circuit delivering an output signal with the frequency of said phasing signal to said multiplier circuit.

3. A phasing network comprising input means for receiving respective phasing and drive signals, a frequency multiplier circuit adapted to receive from said input means an initial phasing signal of predetermined frequency to produce an output signal, and a frequency mixing circuit receiving the output signal of said multiplier circuit and adapted to receive from said input means a drive signal having a predetermined frequency greater than that of said phasing signal and occurring after the occurrence of said phasing signal, said mixing circuit delivering an output signal with a frequency equal to and a phase corresponding to that of said phasing signal to said multiplier circuit.

4. A phasing network comprising input means for receiving respective phasing and drive signals, a frequency multiplier circuit adapted to receive from said input means an initial phasing signal of predetermined frequency to produce an output signal, a frequency mixing circuit receiving the output signal of said multiplier circuit and adapted to receive from said input means a drive signal having a predetermined frequency greater than that of said phasing signal, said mixing circuit delivering an output signal with the frequency and phase of said phasing signal to said multiplier circuit, and control means permitting the delivery of said initial phasing signal to said multiplier circuit preceding the occurrence of an output signal from said mixer circuit.

5. A phasing network comprising an input terminal adapted to receive an initial phasing signal followed by a drive signal having a frequency greater than that of said phasing signal, first and second selective devices receiving signals from said input terminal and respectively delivering phasing and driving output signals, a frequency multiplier circuit adapted to receive output signals from said first selective device, a frequency mixing circuit receiving the output signals of said second selective device and of said multiplier circuit and delivering output signals with the frequency and phase of said phasing signals to said multiplier circuit, and control means permitting the delivery of said phasing signals to said multiplier circuit preceding the occurrence of an output signal from said mixing circuit.

6. A phasing network comprising an input terminal adapted to receive an initial phasing signal followed by a drive signal having a frequency greater than that of said phasing signal, first and second selective devices receiving signals from said input terminal and respectively delivering phasing and driving output signals, a frequency multiplier circuit adapted to receive output signals from said first selective device, a frequency mixing circuit receiving the output signals of said second selective device and of said multiplier circuit and delivering output signals with a frequency and phase of said phasing signals to said multiplier circuit, and a control means having a first state permitting the delivery of said phasing signals to said multiplier circuit and a second state permitting the delivery of only said drive signals to said mixing circuit, said control means being initially in its first state and assuming its second state upon the occurrence of an output signal from said mixing circuit.

7. A phasing network comprising an input terminal adapted to receive initial phasing signals followed by drive signals having a frequency five times the frequency of said phasing signals, a frequency mixing circuit having first and second input lines, and an output line; a first frequency selecting device delivering said phasing signals to the first input line of said frequency mixing circuit; a second frequency selecting device receiving said drive signals and delivering said drive signals at its output lead; a first frequency doubler circuit having a first input line connected with the output line of said mixing circuit, a second input line connected with the output lead of said second selecting device, and an output line; and a second frequency doubler circuit having an input line receiving signals from the output line of said first doubler circuit, and an output line delivering signals to the second input line of said mixing circuit.

8. The phasing network of claim 7 provided with control means having a first state conditioning the delivery of signals from the output lead of said second selecting device to the second input line of said first doubler circuit, and a second state inhibiting the delivery of signals to the second input line of said first doubler circuit; said control means being initially set to its first state, and being reset to its second state by the occurrence of an output signal from said frequency mixing circuit; the output signals from said frequency mixing circuit having the frequency and phase of said phasing signals; while the phase of the output signals from said first doubler circuit is initially determined by said phasing signals.

9. A phasing circuit comprising a first input line adapted to receive phasing signals, a second input line adapted to receive drive signals having a frequency greater than that of said phasing signals, a frequency multiplier circuit adapted to receive phasing signals from said first input line and producing an output signal, a frequency mixing circuit adapted to receive the drive signals from said second input line and output signals from said multiplier circuit and delivering output signals with the frequency and phase of said phasing signals to said multiplier circuit, and control means for permitting and preventing the delivery of signals from said first line to said multiplier circuit; said control means permitting the delivery of phasing signals preceding the occurrence of an output signal from said mixing circuit.

10. A phasing circuit comprising a first input line adapted to receive phasing signals, a second input line adapted to receive drive signals having a frequency greater than that of said phasing signals, a frequency multiplier circuit adapted to receive phasing signals from said first input line and producing an output signal, a frequency mixing circuit adapted to receive the drive signals from said second input line and output signals from said multiplier circuit and delivering output signals with the frequency and phase of said phasing signals to said multiplier circuit, and a control means having a first state permitting the delivery of said phasing signals from said first line to said multiplier circuit and a second state permitting the delivery of only said drive signals to said multiplier circuit, said control means being initially in its first state and assuming its second state upon the occurrence of an output signal from said mixing circuit.

11. A phasing circuit comprising a first input line adapted to receive phasing signals; a second input line adapted to receive drive signals having a frequency five times the frequency of said phasing signals; a frequency mixing circuit having a first input lead adapted to receive phasing signals from the first input line, a second input lead, and an output lead; a first frequency doubler circuit having a first input lead connected with the output lead of said mixing circuit, a second input lead adapted to receive drive signals from said second line, and an output lead; a second frequency doubler circuit having an input lead receiving signals from the output lead of said first doubler circuit, and an output lead delivering signals to the second input lead of said mixing circuit; and control means initially delivering phasing signals from said first line to said first doubler circuit, and after a predetermined time delivering drive signals from said second line to said mixing circuit.

12. The phasing circuit of claim 11 in which said control means comprises a bistable circuit having a first state for delivering signals from said first input line to the second input lead of said first doubler circuit, and a second state delivering signals from said second input line to the second input lead of said first doubler circuit; said control means being initially set to its first state, and being reset to its second state by the occurrence of an output signal from said frequency mixing circuit; the output signals from said frequency mixing circuit having the frequency and phase of said phasing signals; while the phase of the output signals from said first doubler circuit are initially determined by said phasing signals.

13. A signal phasing circuit comprising a resonant circuit having an input means for receiving an external phasing signal, a multiplier circuit excited by said resonant circuit, and a mixing circuit excited by said multiplier circuit and having an input means for receiving an external drive signal having a frequency greater than that of said phasing signal, said mixing circuit exciting said resonant circuit.

14. A signal phasing circuit comprising a frequency storing circuit having an input means for receiving an external phasing signal, and a device having a first circuit excited by said frequency storing circuit for producing multiple frequency signals, said device having a mixing circuit excited by its said first circuit and an input means for receiving an external driving signal having a frequency greater than that of said phasing signal, said mixing circuit exciting said frequency storing circuit.

15. A signal phasing circuit comprising a resonant circuit having an input means for receiving an external phasing signal, and a valve having a first electrode circuit excited by said resonant circuit to control the current of said valve and biased to produce multiple frequency signals, said valve having a second electrode mixing circuit excited by the current produced by the first circuit, and an input terminal connected with the second electrode of said valve and adapted to receive a driving signal of frequency greater than that of said phasing signal, said second electrode mixing circuit exciting said resonant circuit.

16. The signal phasing circuit of claim 15 in which said valve is provided with an anode, and including a second resonant circuit excited by current passing through the anode of said valve and being inductively coupled with said first resonant circuit.

17. The signal phasing circuit of claim 16 including a third resonant circuit excited by the anode current of said valve for producing a signal having a frequency which is greater than that of said phasing signal and less than that of said driving signal.

18. The signal phasing circuit of claim 17 including means for initially providing a phasing signal to said first resonant circuit and in which said third resonant circuit delivers an output signal with a phase determined by said phasing signal and a frequency which is a multiple of said phasing signal and a sub-multiple of said driving signal.

19. The method of deriving an output signal of a frequency related to that of a first input signal by a ratio $M/N$ of integers M and N where M is an integer less than the integer N, in such a way that the phase of the output is unambiguously resolved by at least a momentary application of a second input signal whose frequency is equal to an integral submultiple of the frequency of said output signal, which comprises: initially applying said second input signal to a resonant circuit, producing an harmonic of the frequency of the signal in said resonant circuit; mixing said harmonic with said first input to produce a beat frequency and using the beat produced to maintain a predetermined phase relationship between said first input and the oscillations in said resonant circuit.

20. The method of deriving an output signal of a frequency related to that of a first input signal by a ratio $M/N$ of integers M and N where M is an integer less than the integer N, in such a way that the phase of the output is unambiguously resolved by at least a momentary application of a second input signal whose frequency is equal to an integral submultiple of the frequency of said output signal, which comprises: initially applying said second input signal to a resonant circuit, producing an harmonic of the frequency of the signal in said resonant circuit, mixing said harmonic with said first input to produce a beat frequency and using the beat produced to maintain a predetermined phase relationship between said first input and the oscillations in said resonant circuit, and producing said output from an integral harmonic of the frequency in said circuit.

21. The method of deriving an output signal of a frequency related to that of a first input signal by a ratio of two to an odd integer greater than 1, in such a way that the phase of the output is unambiguously resolved by at least a momentary application of a second input signal whose frequency is equal to an integral submultiple of the frequency of said output signal, which comprises: initially applying said second input signal to a resonant circuit, producing an harmonic of the frequency of the signal in said resonant circuit, mixing said harmonic with said first input to produce a beat frequency and using the beat produced to maintain a predetermined phase relationship between said first input and the oscillations in said resonant circuit, and producing said output from an integral harmonic of the frequency in said circuit.

22. The method of deriving an output signal of a frequency related to that of a first input signal by a ratio $M/N$ of integers M and N where M is an integer less than the integer N, in such a way that the phase of the output is unambiguously resolved by at least a momentary application of a second input signal whose frequency is equal to an integral submultiple of the frequency of said output signal, which comprises: initially applying said second input signal to a resonant circuit, producing an harmonic of the frequency of the signal in said resonant circuit, mixing said harmonic with said first input to produce a beat frequency, and using the beat so produced to excite said resonant circuit to maintain oscillations therein.

23. The method of deriving an output signal of a frequency related to that of a first input signal by a ratio $M/N$ of unequal integers M and N neither of which is 1, in such a way that the phase of the output is unambiguously resolved by at least a momentary application of a second input signal whose frequency is equal to an integral submultiple of the frequency of said output signal, which comprises: initially applying said second input signal to a resonant circuit, producing an harmonic of the frequency of the signal in said resonant circuit, mixing said harmonic with said first input to produce a beat frequency, using the beat so produced to excite said resonant circuit to maintain oscillations therein and producing said output from an harmonic of the frequency in said resonant circuit.

24. The method of deriving an output signal of a frequency related to that of a first input signal by a ratio $M/N$ of unequal integers M and N neither of which is 1, in such a way that the phase of the output is unambiguously resolved by at least a momentary application of a second input signal whose frequency is equal to an integral submultiple of the frequency of said output signal, which comprises: initially applying said second input signal to a resonant circuit, producing an harmonic of the frequency of the signal in said resonant circuit, mixing said harmonic with said first input to produce a beat frequency, and using the beat so produced to control the phase relationship between the first input and the output.

25. A phasing network comprising a multiplier circuit having a first input lead for receiving a phasing signal, a second input lead, and an output lead; a mixing circuit having a first input line receiving signals from the multiplier circuit and a second input line for receiving a drive signal, and having an output line delivering signals to the second input lead of said multiplier circuit; and signal input means for receiving respective external phasing and drive signals and delivering said phasing signal to the first input lead of said multiplier circuit and delivering said drive signal to the second input line of said mixing circuit.

References Cited by the Examiner

Chance et al.: "Waveforms," vol. 19 of M.I.T. Radiation Lab. Series (Figs. 15.12 and 15.13, pages 563–64), published 1949 by McGraw-Hill.

ARTHUR GAUSS, *Primary Examiner.*

J. JORDAN, *Assistant Examiner.*